Figure 1:
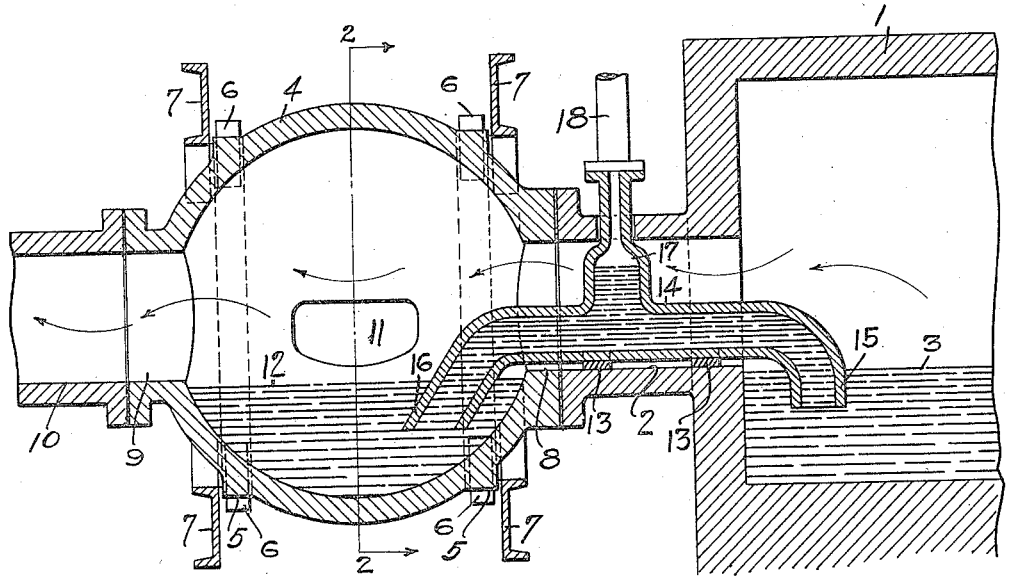

G. E. HOWARD.
GLASS MELTING TANK FURNACE.
APPLICATION FILED NOV. 15, 1913.

1,138,111.

Patented May 4, 1915.

WITNESSES.

INVENTOR.

UNITED STATES PATENT OFFICE.

GEORGE E. HOWARD, OF BUTLER, PENNSYLVANIA, ASSIGNOR TO THE PITTSBURGH PLATE GLASS COMPANY, OF PITTSBURGH, PENNSYLVANIA, A CORPORATION OF PENNSYLVANIA.

GLASS-MELTING TANK-FURNACE.

1,138,111.    Specification of Letters Patent.    Patented May 4, 1915.

Application filed November 15, 1913. Serial No. 801,271.

*To all whom it may concern:*

Be it known that I, GEORGE E. HOWARD, a citizen of the United States, and resident of Butler, in the county of Butler and State of Pennsylvania, have invented a new and useful Improvement in Glass-Melting Tank-Furnaces; and I do hereby declare the following to be a full, clear, and exact description thereof.

My invention relates to melting furnaces and is particularly concerned with improvements in the means for delivering the glass from the furnace tank into an auxiliary furnace that can be rotated or tipped to discharge the glass required for working into sheets, plates, etc.

Specifically the invention involves the employment of a tiltable auxiliary furnace whose tilting movement is entirely independent of the connection with the main furnace tank.

Several advantages flow from the use of the tilting furnace, especially in connection with the manufacture of large sheets or plates of glass. The particular advantage is that glass delivered or poured in this way flows over a spout or edge much in the same manner as the flow from casting pots which up to the present have been the only practical means for the delivery of glass for the manufacture of plate glass. The apparatus heretofore devised and employed for this purpose consists in general of a movable furnace or refining pot entirely outside and substantially independent of the melting tank. This pot could be tilted or rotated to a central axis for pouring out or discharging the glass therefrom, and the only practical way heretofore found of delivering the glass from the melting furnace to the outside or refining pot was by flowing the glass from the melting tank through an open spout into the movable furnace or pot. This has been found objectionable for several reasons: First, it is necessary to discharge the glass from a movable furnace continuously or at the rate of melting. To attempt to obviate this by damming up the spout and releasing portions of the glass in a comparatively small stream and then permitting the glass to fall back into the main body carries fine bubbles into the body of the glass and also causes defects known to the trade as ream. The only practical method yet found for taking molten glass from one mass or body and causing it to unite in another mass or body has been through the use of a spout of comparatively large section, said spout being located at or beneath the level of the glass in the main tank. This method of discharge would not be practical for delivering the glass into a tilting furnace as the connection between the tilting furnace and the melting tank must necessarily be flexible in order to permit the tilting movement of the tilting furnace.

Liquid or molten glass possesses certain chemical properties and at an extremely high temperature they do not permit of the use of materials ordinarily employed to produce a flexible connection, nor can these materials to be used to produce a liquid tight joint as is customary with cold fluid.

The main object of the present invention, therefore, is to secure the discharge of molten glass from a stationary melting tank to a tiltable furnace under such conditions that the molten glass will be maintained uniformly at substantially the temperature of the melting furnace and at the same time the discharge from the main furnace will not interfere with the tilting of the tiltable furnace.

A further object is to provide for such delivery of the glass without the production of ream or other defects in the body of the glass.

In the accompanying drawings, I have illustrated improved means for obtaining the results above defined.

Figure 2:
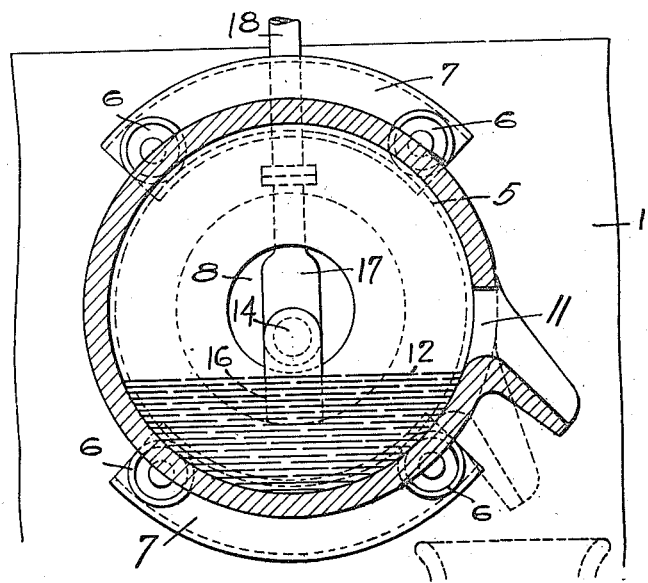

In said drawings, Figure 1 is a longitudinal vertical sectional view of the tank of the melting furnace and the tilting furnace. Fig. 2 is a transverse vertical section on the lines 2—2 Fig. 1.

In the embodiment of the invention herein selected for illustration, 1 indicates the melting tank of a glass tank furnace of ordinary construction in its general arrangement and having a communicating conduit, 2. Adjacent the end of the conduit is a rotatably mounted a tilting furnace 4 which may be conveniently provided with annular bearing surfaces 5—5 adapted to run on anti-friction rollers 6—6 mounted on suitable frames 7—7. The tiltable furnace has an inlet opening 8 preferably circular in outline to correspond to the preferably circular conduit 2 of the tank. Said tilting furnace is also provided at its opposite side with a flue 9 which may communicate with any suitable form of stack 10 to carry off the hot gases passing from the tank 1 through said conduit 2 and into the tiltable furnace 4. The tiltable furnace is also provided with a discharge outlet 11 for the discharge of the molten glass when the furnace is tilted as indicated in dotted outline, Fig. 2. Normally, however, or while the tilting furnace is being filled or when not discharging glass, the level of the glass therein will be at 12 corresponding with the level 3 of the glass in the furnace tank 1.

In order to convey glass from the tank furnace 1 to the tilting furnace 4 without in any manner interfering with the tilting action of the latter, I utilize the siphon principle as follows: Extending through the conduit 2 and tank furnace 1 and preferably supported therein, as at 13—13 is a siphon tube 14 formed of refractory material and having one end 15 arranged to dip beneath the surface of the glass in the furnace tank 1; for the purpose of maintaining the siphon connection when the level of the glass in the tiltable furnace falls below that in the tank, the end 16 is made somewhat longer than the end 15, so that said end 16 will still be below the level in the furnace 4 after a reasonable amount of glass has been discharged therefrom. If, therefore, the siphon tube be filled with molten glass, said glass will naturally flow by siphon action from the furnace tank into the tiltable tank until the levels in each are the same. In order conveniently to fill the siphon tube with molten glass whenever it is desired to operate the furnace, the siphon tube 14 is provided with the off-set 17 connected by the pipe 18 with means for causing a partial vacuum in the off-set chamber 17 for drawing in and maintaining the molten glass within the siphon tube, whereby the level of the glass in the siphon tube is maintained. By varying the partial vacuum in off-set 17 the level of glass in the siphon tube may be maintained at any height desired. That is to say, the depth of the glass above the horizontal part of the siphon tube may be varied to any extent short of the vanishing point so that the rate of flow of the glass through the siphon tube may be distinctly varied, thus furnishing a means for regulating the flow of glass through the siphon member.

In the operation of the apparatus and with the glass in the furnace at the level 3 a sufficient amount of molten glass must first be ladled into the tilting furnace to bring the level therein above the level of the lower end 16 of the siphon 2. Thus the body of glass within the tilting furnace is in direct communication through the siphon tube with the glass in the furnace tank 1, and it is obvious that the glass will then flow from the furnace tank 1 into the tilting tank 4 until the level in both is the same. The siphon connection is then brought into operation and the siphon tube is filled with molten glass which may extend partially up into the vacuum chamber or off-set 17. For discharging glass from the tilting furnace into a pot, ladle or onto a table for working, drawing, etc., the tilting furnace 4 is rotated by any suitable means until its discharge spout 11 comes below the level of the glass therein, when said glass flows by gravity out through said discharge spout. It will be noted that the siphon tube is free of the tilting furnace, thus avoiding all contact with the tilting furnace and avoiding interference with the rotation thereof. Obviously the molten glass will maintain a level surface as the tilting furnace is turned and as said glass is discharged from said tilting furnace, its level will be momentarily lowered, and further supplies of molten glass will immediately begin to flow from the melting tank through the siphon tube into the tilting furnace and until the level within the tilting furnace is restored to that of the tank 1. Thus is provided means for flowing molten glass from a stationary melting tank into a discharge or tilting furnace without in any manner interfering with the tilting action of said furnace and at the same time maintaining the bodies of molten glass in both furnaces substantially in one continuous body. Furthermore, it will be seen that by the arrangement of the connecting conduit and the flue of the tilting furnace, the glass therein is subjected at all times to the heating gases from the furnace tank. Again, the amount of glass within the tilting furnace may be at all times restored, and by properly proportioning the siphon tube and discharge opening of the tilting furnace, a continuous discharge of glass from the melting furnace may be secured until the level of the glass in the melting furnace falls below the end 15 of the siphon 2. On the other hand, by properly proportioning the capacity of the tilting furnace, large predetermined quantities of glass may be discharged therefrom before its level falls below the lower end 16 of the siphon 2. It is to be understood, however, that the proportionate size of the siphon tube and the discharge opening of the tiltable member may be such that the siphon action will not be interrupted, but the end 16 of the siphon tube will always be submerged below the level of the glass in the tilting member. Thus a continuous flow of glass from the tilting furnace may be secured, if desired. A further advantage consists in the fact that the siphon action may be interrupted and the siphon tube cleared by admitting air into the siphon tube through the vacuum connection 18. Thus the connection between the tank may be broken and the entire contents of tank may be withdrawn and said furnace cleared for inspection and repair.

What I claim is:

1. In a delivery device for a glass furnace, the combination with a stationary glass melting tank, of a separate delivery reservoir having a discharge opening movable from a position substantially on a level with the glass in the melting tank to a point below such level and a siphon member for transferring the glass from said stationary tank to said delivery reservoir, and means for breaking said siphon connection to clear said tiltable furnace for inspection and repair.

2. In a delivery device for glass furnace, the combination with a glass melting tank, of a separate delivery reservoir having a discharge opening movable from a position substantially on a level with the glass in the melting tank to a point below such level, and a siphon member for transferring the glass from said tank to said reservoir, and means for regulating the height of the glass in said siphon member.

3. In a delivery device for glass furnaces, the combination with a stationary glass melting tank, of a tiltable delivery reservoir having a discharge opening movable from a position substantially on a level with the glass in the melting tank to a point below such level, and a siphon member for transferring the glass from said tank to said delivery reservoir, and means for regulating the height of the glass in said siphon member.

4. In a delivery device for a glass furnace, the combination with a glass melting tank, a separate delivery reservoir having a discharge opening constructed and arranged to move from a position substantially on a level with the glass in the melting tank to a point below such level, a siphon member for transferring glass from said stationary tank to said delivery reservoir, said siphon member having means for regulating height of glass therein, whereby flow of glass can be accelerated while the delivery reservoir is discharging.

5. In a delivery device, for a glass furnace, the combination with a glass melting tank, of a separate delivery reservoir having a discharge opening, a siphon member for transferring the glass from said tank to said delivery reservoir, said siphon being of sufficient sectional area to normally flow materially more glass in any given time than the corresponding melting rate of tank, so that when said opening is lowered below the level of the glass in said tank, a flow of glass in relatively large amount occurs in the siphon member, and assists in maintaining the level of the glass in the delivery reservoir during the discharging period.

6. In a delivery device for a glass furnace, the combination with a glass melting tank, of a separate delivery reservoir, having a discharge opening movable from a position substantially on a level with the glass in the melting tank to a point materially below such level, a siphon member of sufficiently large section to flow at a rate materially higher than the melting rate of tank, whereby the level of glass in the discharge chamber can be quickly returned to the level of glass in the melting tank.

7. In a delivery device for a glass furnace, the combination with a glass melting tank, and a separate delivery reservoir having a discharge opening, a siphon member for transferring the glass from said melting tank to said delivery reservoir, said parts being so constructed that when the discharge opening is tilted downward a discharge of glass is effected and upon tilting the discharge opening upward above the level of the glass in the melting tank, the discharge is stopped.

8. In a delivery device for a glass furnace, the combination with a glass melting tank, and a separate delivery reservoir having a discharge opening movable from a position substantially on a level with the glass in the melting tank to a point materially below such level, a siphon member for transferring glass from said tank to said delivery reservoir and after the flow in the siphon has raised the level in the delivery reservoir to the level in the tank, flow ceases in the siphon, thus keeping the glass in all parts between the periods of discharge in a state of rest and allowing the glass to settle into a homogeneous mass, thus eliminating any inequalities caused by the flow in any of said parts.

In testimony whereof, I the said GEORGE E. HOWARD have hereunto set my hand.

GEORGE E. HOWARD.

Witnesses:
ROBERT C. TOTTEN,
JOHN F. WILL.